Aug. 25, 1953

G. K. TEAL 2,650,191

PREPARATION OF TWO-SIDED MOSAIC

Filed Dec. 29, 1948

INVENTOR
G. K. TEAL

BY Hugh S. Wertz

ATTORNEY

Patented Aug. 25, 1953

2,650,191

UNITED STATES PATENT OFFICE 2,650,191

PREPARATION OF TWO-SIDED MOSAIC

Gordon K. Teal, Summit, N. J., assignor to Bell Telephone Laboratories, Incorporated, New York, N. Y., a corporation of New York Application December 29, 1948, Serial No. 67,915

3 Claims. (Cl. 204—3)

This invention relates to electro-optical devices and more specifically to methods of making target or screen structures for use in television transmitter tubes.

It has long been recognized in the development of electron camera tubes for generating picture signals at a television transmitting station that there are many advantages in projecting an electron image of the object for transmission onto one side of the screen of the tube and scanning the opposite side of the screen with a cathode ray beam formed in the tube. An example of a camera tube employing such a "two-sided" target or screen is the so-called "image orthicon" tube described in an article entitled "The image orthicon—A sensitive television pick-up tube," by Albert Rose, Paul K. Weimer and Harold B. Law, appearing in the July 1946 issue of the Proceedings of the I. R. E., beginning on page 424. The two-sided target makes possible the separation of charging and discharging processes so that the sensitizing procedures and electric fields appropriate to each can be incorporated in the tube without mutual interference. The target must conduct charges between its two sides or surfaces but not along either surface. Moreover, it should have a conducting element therein or nearby to act as the common capacitor plate for the separate picture elements. It has been found very difficult to construct satisfactorily commercial targets of this type.

It is an object of the present invention to provide novel and improved methods for making two-sided electron camera tube targets which have a large number of elemental discrete conducting elements per square inch.

In accordance with an exemplary embodiment of the invention, a magnetic process of making a two-sided mosaic screen or target suitable for electron camera tubes is employed. A magnetic pole-piece is covered with wax and a number of tiny permanent magnets are sifted onto the wax so that they are drawn to it by the pole-piece and have their ends buried in the wax. A suitable substance such as plaster of Paris is placed around the wires and the wax then removed. The tops of the wires are covered with an insulator and nickel is evaporated or electroplated onto the insulator. The top of the metal is smoothed and a conducting film, such as aluminum, for example, is evaporated onto the smooth surface. The plaster is then removed, a silver head (an enlargement of the end of the wire) is electroplated on each wire and the conducting film is dissolved off, leaving a two-sided mosaic screen.

Figure 9:
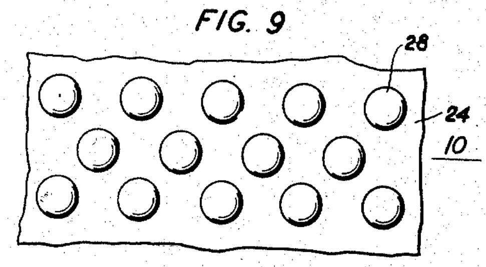
Figure 10:
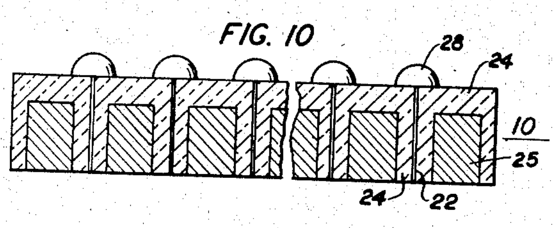

The invention will be more readily understood by referring to the following description taken in connection with the accompanying drawing forming a part thereof, in which:

Figs. 1 to 8, inclusive, illustrate various steps in a process, in accordance with the invention, of making a two-sided screen or target structure for use in television transmitter tubes;

Fig. 9 is top view of a schematic representation, in greatly enlarged form, of a portion of a target made in accordance with the invention; and Fig. 10 is a sectional schematic side view of portions of a target of the type shown in Fig. 9.

Referring more particularly to the drawing, Figs. 9 and 10 show, by way of example for purposes of illustration, portions of a two-sided mosaic target suitable for use in certain television transmitting tubes such as, for example, the image orthicon briefly referred to above. This target 10 comprises a thin metallic screen 25 of a suitable material, such as nickel, having a large number of holes to the linear inch, e. g., 400 to the inch or more. One surface, such as the top surface in the view of Fig. 10, and the interior of all the apertures, are coated with an insulating material 24. The interior of all these apertures is filled with metallic plugs 22 having heads 28 thereon. Successive steps in the preparation of the screen or target 10 will be easily understood by referring to Figs. 1 to 8, inclusive.

Figure 1:
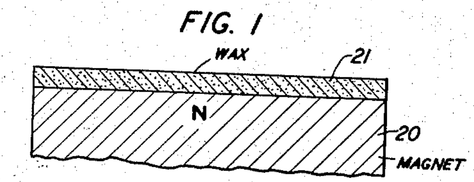
Figure 2:
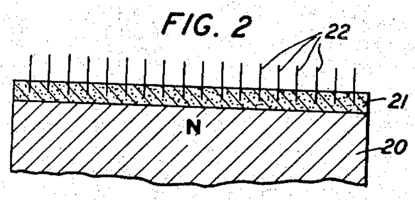

Considering now in detail the various steps in the process, an iron or nickel wire is permanently magnetized longitudinally and then cut into short lengths, of .002 inch to .003 inch, for example. The diameter of the wire can be, for example, .005 inch to .001 inch. Next, the pole-piece of a strong electromagnet 20 is coated with a thin film of wax 21, as shown in Fig. 1. The small permanent magnets previously formed are then sifted through a sieve of non-magnetic material so that they will be drawn to the wax coated pole-piece 20 of the magnet. This step is accomplished in vacuo, if necessary. The tiny magnets are accelerated towards the wax-covered pole-piece 20 and can be made to hit sufficiently hard to have their ends buried into the wax in the manner shown in Fig. 2. This figure shows a number of small electromagnets 22 perpendicular to the surface of the wax coating 21.

Figure 3:
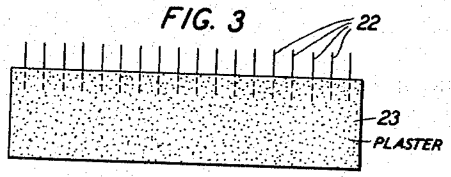
Figure 4:
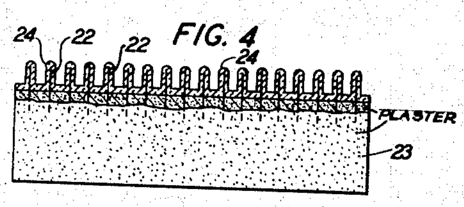
Figure 5:
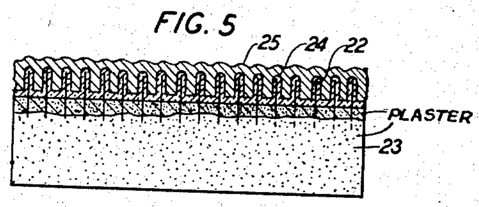

Very fine plaster of Paris is then applied to the upper side of the wax coating 21 after the magnet 20 has been removed. The plaster of Paris base 23 is shown in Fig. 3 in a partly elevational and a partly sectional view. The wax coating 21 is then melted and the traces remaining removed with a solvent, such as carbon tetrachloride, for example. The wires 22 are thus imbedded in the plaster base 23, as shown in Fig. 3. Magnesium or other suitable metal is then evaporated on the unit and oxidized to form a coating 24 of magnesium oxide around the ends of the wires 22, as shown in Fig. 4. Melted glass can be used, instead of the magnesium oxide. A nickel coating 25 is then evaporated on the unit, as shown in Fig. 5, to give a conducting film. The film 25 is built up by evaporation or by electroplating.

Figure 6:
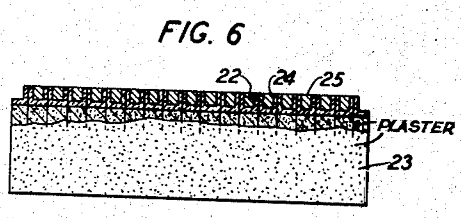
Figure 7:
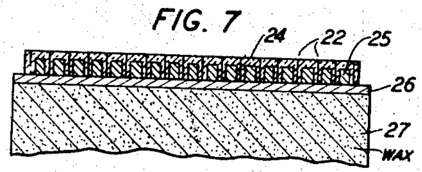

The structure shown in Fig. 5 is then buffed on its top surface with fine emery or other suitable buffing material to expose the ends of the wires 22 and thus to produce the unit shown in Fig. 6. A conducting film of aluminum, for example, 26 is then evaporated upon the unit and this film 26 is attached to a block of wax 27. The plaster of Paris 23 is then ground or dissolved off. The unit at this stage of the process is shown in Fig. 7 which is upside down with reference to Figs. 3 to 6.

Figure 8:
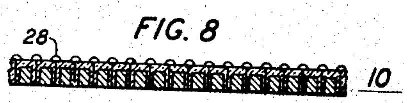

Silver heads 28 are then electroplated on the nickel wires 22. The wax 27 is then dissolved with carbon tetrachloride and the aluminum film 26 is dissolved with potassium hydroxide, respectively. The completed unit is shown in Fig. 8 which is similar to Fig. 10 except that it is drawn to a much smaller scale.

Obviously, various modifications can be made in the process described above. By way of example, the step where nickel is evaporated on the unit to give a conducting film can be eliminated if it is desired to make a grid mosaic which is of the non-barrier grid type.

What is claimed is:

1. The method of preparing a two-sided mosaic screen or target which comprises the steps of placing a sticky coating on a magnetic pole-piece, dropping a multiplicity of tiny magnetic wires upon said sticky substance to be held in a substantially vertical position with respect to the surface of said substance by the action of said pole-piece, removing the pole-piece, embedding the exposed end of each wire in a support member, removing the sticky coating, covering each of the then exposed ends of said wires with insulating material, filling in the spaces between said insulated wires with conducting material, buffing said conducting material to expose the covered end of each of said wires and to form a smooth surface of conducting material interspaced with insulating material, removing the support member to expose the other end of each of said wires, and electroplating heads of metallic material on the ends of said wires exposed by the removal of the support member.

2. The method of preparing a two-sided mosaic screen or target which comprises the steps of forming an array of individual tiny wires of magnetic material arranged substantially parallel to one another by magnetic means, covering each of said wires with insulating material, filling in the spaces between said insulated wires with conducting material, buffing said conducting material to expose the covered end of each of said wires and to form a smooth surface of conducting material interspersed with insulating material, removing the support member to expose the other end of each of said wires, and electroplating heads of metallic material on the ends of said wires exposed by the removal of the support member.

3. The method of preparing a two-sided mosaic screen or target which comprises the steps of placing a sticky coating on a magnetic pole-piece, dropping a multiplicity of tiny magnetic wires upon said sticky coating to be held in a substantially vertical position with respect to the surface of said substance by the action of said pole-piece, removing the pole-piece, embedding the upper side of said wires in a supporting substance, removing the sticky coating, reversing the supporting substance and the member carried thereby, applying insulation around the exposed upper ends of said wires, forming a conducting coating between and over the insulated wires, buffing said conducting coating to expose the covered ends of said wires and to form a smooth surface of conducting material interspersed with insulating material, applying a metallic coating to the smooth surface, applying a second supporting substance to said metallic coating, removing the first-mentioned supporting substance, reversing the second supporting substance and the member carried thereby to expose the wires at the upper part thereof, electroplating heads of metallic material on the exposed ends of said wires, and then removing the second supporting substance.

GORDON K. TEAL.

References Cited in the file of this patent

UNITED STATES PATENTS

| Number | Name | Date |
|---|---|---|
| 2,020,117 | Johnston | Nov. 5, 1935 |
| 2,162,808 | Gallup | June 20, 1939 |
| 2,175,701 | Rose | Oct. 10, 1939 |
| 2,217,334 | Diggory et al. | Oct. 8, 1940 |
| 2,369,569 | Hulbert | Feb. 13, 1945 |
| 2,455,513 | McGee | Dec. 7, 1948 |

FOREIGN PATENTS

| Number | Country | Date |
|---|---|---|
| 353,332 | Great Britain | July 23, 1931 |